United States Patent
Leimann

(10) Patent No.: US 7,210,853 B2
(45) Date of Patent: May 1, 2007

(54) GEAR SHAFT BEARING ASSEMBLY

(75) Inventor: Dirk-Olaf Leimann, Antwerp (BE)

(73) Assignee: Hansen Transmissions International NV, Antwerp (BE)

( * ) Notice: Subject to any disclaimer, the term of this patent is extended or adjusted under 35 U.S.C. 154(b) by 106 days.

(21) Appl. No.: 10/471,647

(22) PCT Filed: Mar. 12, 2002

(86) PCT No.: PCT/IB02/01805

§ 371 (c)(1),
(2), (4) Date: Apr. 16, 2004

(87) PCT Pub. No.: WO02/073054

PCT Pub. Date: Sep. 19, 2002

(65) Prior Publication Data

US 2004/0161185 A1    Aug. 19, 2004

(30) Foreign Application Priority Data

Mar. 12, 2001 (GB) ................................. 0106004.5
Mar. 30, 2001 (GB) ................................. 0107922.7

(51) Int. Cl.
*F16C 33/58* (2006.01)
(52) U.S. Cl. ...................................... 384/571; 384/903
(58) Field of Classification Search ................ 384/571, 384/504, 561, 903; 475/218, 219, 329, 330, 475/290, 302, 317; 74/329, 331, 606 R
See application file for complete search history.

(56) References Cited

U.S. PATENT DOCUMENTS

| 1,815,689 | A |   | 7/1931  | Wiedmaier |
|-----------|---|---|---------|-----------|
| 3,574,424 | A |   | 4/1971  | Hagemeister |
| 4,036,076 | A | * | 7/1977  | Anderson ................. 74/409 |
| 4,463,622 | A | * | 8/1984  | Freiburger ................ 74/331 |
| 4,573,366 | A | * | 3/1986  | Kennard ................ 74/606 R |
| 6,324,943 | B1 | * | 12/2001 | Sahara ................. 74/813 R |

FOREIGN PATENT DOCUMENTS

DE        33 04 358        8/1984

* cited by examiner

*Primary Examiner*—Thomas R. Hannon
(74) *Attorney, Agent, or Firm*—Young & Thompson

(57) ABSTRACT

The invention relates to a shaft bearing assembly and also to an industrial gear unit (30) comprising this bearing assembly. The bearing assembly (34) comprises two taper roller bearings mounted axially spaced apart on the shaft (35) with the bearings orientated in an O arrangement in which the rollers of each bearing increase in diameter in the direction away from the other bearing of the pair. In a gear unit (30) the outer cup of the taper roller bearing may be located by an abutment shoulder (32) formed in the housing (11) whilst the inner cone of the taper roller may be located by a lock nut (40) on a threaded end portion of the shaft (35) or by a circlip (61) disposed in annular groove in the shaft (35).

1 Claim, 3 Drawing Sheets

GEAR SHAFT BEARING ASSEMBLY

This invention relates to a gear shaft bearing assembly and in particular, though not exclusively, to a bearing assembly for an intermediate shaft of an industrial gear unit It relates also to an industrial gear unit comprising said bearing assembly.

An intermediate shaft is a shaft which supports components for transmission of torque between other shafts of the gear unit and is not employed to transmit torque through the housing wall direct to an external component.

In industrial gear units it is known to mount intermediate and other shafts in bearings of different types, such as cylindrical roller bearings, spherical roller bearings or taper roller bearings. The established practice, when using taper roller bearings for the support of an intermediate shaft, is to provide the bearings in a so called X arrangement (known also as direct mounting) in which the inner bearing rings may be regarded as positioned axially closer to another than the outer bearing cups whereby movement of the outer bearing rings axially towards one another in the assembly results in application of preload to the respective bearings.

To make a correct adjustment of the bearing arrangement it is therefore necessary to provide reference surfaces on the gear unit housing. This allows the axial clearance to be adjusted and thereby limit or adjust the radial clearance of each bearing. The preload also can be utilised to increase the capacity and thus the life-time capability of tapered roller bearings used in this manner.

In order to adjust the clearance or selected preload in the conventional arrangement of tapered roller bearings on an intermediate shaft, one end of the shaft may be located in position by means of one of the pair of axially spaced bearings arranged to engage a bearing seat in the housing, and the other end is then located by means of a second bearing of the pair with the outer cup loaded axially relative to the other bearing whilst an axial locking device is fitted to the housing thereby to hold the intermediate shaft and bearing assembly within the housing. The axial location typically is achieved by the use of either cover members, which can be expensive, or circlips and support rings which can be more economical. However, the use of circlips is not always convenient, partly because of limited availability of circlips of the required size and partly because of the limited ability of circlips to withstand axial forces when located in circlip grooves specially machined in the material typically grey cast iron, from which the housing is formed.

In addition to the aforementioned difficulty a further disadvantage of the conventional arrangement for mounting an intermediate shaft is that the degree of axial and thus radial preload of the tapered roller bearings of the intermediate shaft is very sensitive to temperature difference between the inner ring, ie the cone, and the outer ring, ie the cup of each bearing. Thus, for example, considering a standard gear unit housing of grey cast iron having a coefficient of thermal expansion of $9 \times 10^{-6}/°$ C. and a shaft of steel having a coefficient of thermal expansion of $11 \times 10^{-6}/°$ C. typically the housing temperature in use is up to 20° C. less that the shaft temperature, and bearing adjustment typically is performed at ±20° C. For a shaft temperature of 90° C. and length of 400 mm the effect of differential expansion will be an increase of shaft length of 0.128 mm realtive to the housing ($(90-20)$ ° $C. \times 11 \times 10^{-6} \times 400$ less $(90-20)$ ° $C. \times 11 \times 10^{-6} \times 400$). In consequence there is a significant increase in bearing pre-load.

The difficulty of achieving the required preload results in a limitation in the lifetime of the bearings. Because the bearings of the intermediate shaft typically are the most highly loaded bearings of the gear unit they place a limitation on the load capacity of a gear unit. Whilst that difficulty can be mitigated by use of larger bearings, often there is a limitation in respect of available space. In the case of housing of a split construction this is a particular difficulty because the space available is generally less than in the case of housings of a monolithic design.

Objects of the present invention include one or more of obtaining a higher lifetime from the use of preloaded taper roller bearings, the provision of a bearing arrangement that can be relatively easily and safely adjusted, and which furthermore is not unduly adversely affected by temperature differences during operation.

In accordance with one aspect of the present invention a bearing assembly for an intermediate gear shaft of an industrial gear unit comprises two taper roller bearings mounted axially spaced apart on the intermediate shaft with the bearings orientated in an O arrangement in which the rollers of each bearing increase in diameter in a direction away from the other bearing of the pair.

The present invention teaches that the intermediate shaft is used as a reference point for adjustment of the clearance or preload (including adjustments made for the purpose of taking into account deformation of surrounding components such as the housing of the gear unit).

Axial retention of the taper roller bearings on the shaft may be achieved by use of, for example, lock nuts or circlips, which in consequence are required to be of only a smaller size than those used in prior art constructions where the diameter of the locking device is related to that of each bearing cup.

The invention further teaches that the intermediate shaft may be formed of a hardened material thereby better Facilitating the use of circlips without risk of location failure.

The invention will now be described in more detail by way of example with reference to the accompanying drawings in which.

Figure 1:
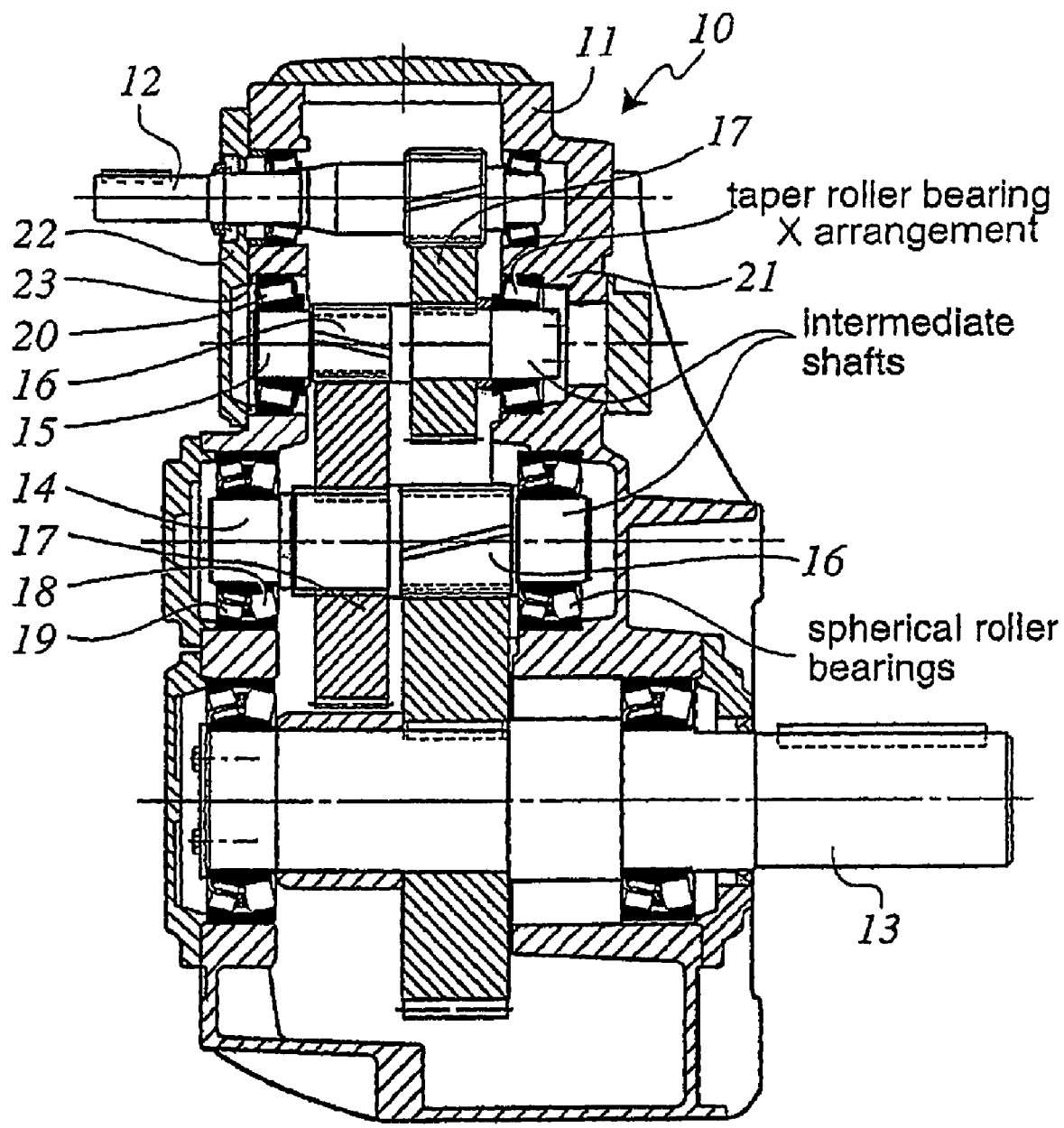
FIG. 1 is a sectional view of a three stage gear unit having conventional positioning of taper roller bearings.

FIG. 1 shows a gear unit 10 having a housing 11, which supports a high speed input shaft 12 and a low speed output shaft 13. Between the shafts 12, 13 there is provided an assembly of two intermediate shafts 14, 15 each provided with a toothed pinion 16 and toothed gear 17 in known manner.

The lower speed intermediate shaft 14 is supported by an assembly of pairs of spherical roller bearings 18, 19. The higher speed intermediate shaft 15 is supported solely by a pair of taper roller bearings 20 mounted in X arrangement in known manner.

For the shaft 15 the outer cup of one of the taper roller bearings is axially located by an annular abutment 21 provided by the gear unit housing. The outer cup of the other taper roller bearing of the pair is axially supported in the assembly by means of a cover plate 22 and spacer shims 23 provided between the cover plate and outer cup.

Figure 2:
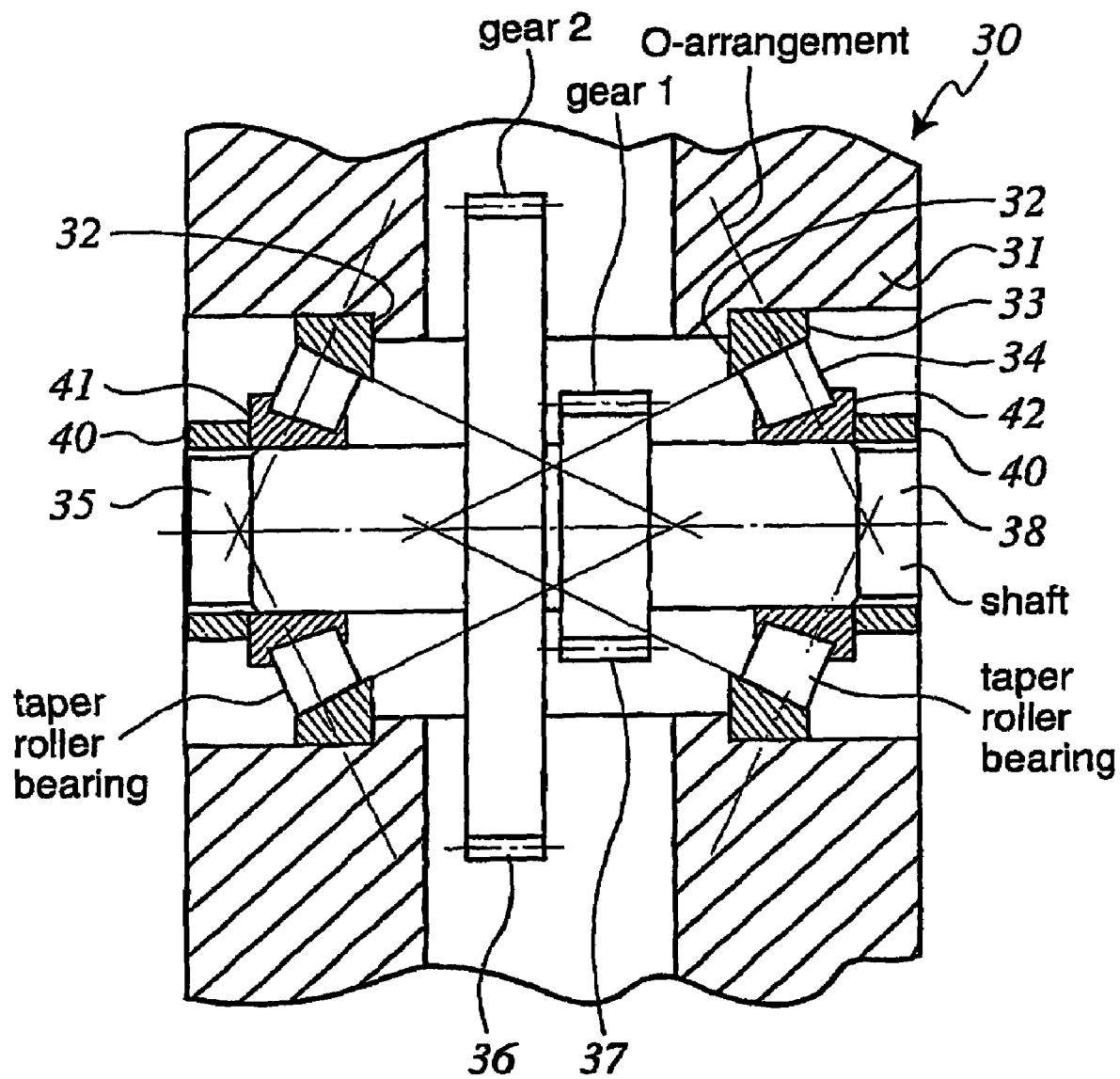
FIG. 2 shows is a sectional view of part of a gear unit in accordance with the present invention.

FIG. 2 shows the bearing assembly configuration of an intermediate shaft of a gear unit in accordance with the present invention. The gear unit 30 comprises a housing 31 formed with a pair of axially outwardly facing abutment surface 32 against which the outer bearing cups 33 of a pair of taper roller bearings 34 abut in the assembly.

The shaft 35 is formed of surface-hardened steel and has secured thereto two teethed gears 36, 37 in known manner.

Each end of the shaft Is provided with a screw thread formation 38 and carries a locking nut 40 having an abutment face 41 to bear against and locate an outer face of the bearing cone 42.

In forming the bearing assembly one locking nut 40 is screwed fully on to the screw thread and tightened in position. Subsequent to installation of the shaft and pair of taper roller bearings in position in the gear unit 30 a second of the two locking nuts 40 is screwed onto the other end of the shaft and locked into position.

Figure 3:
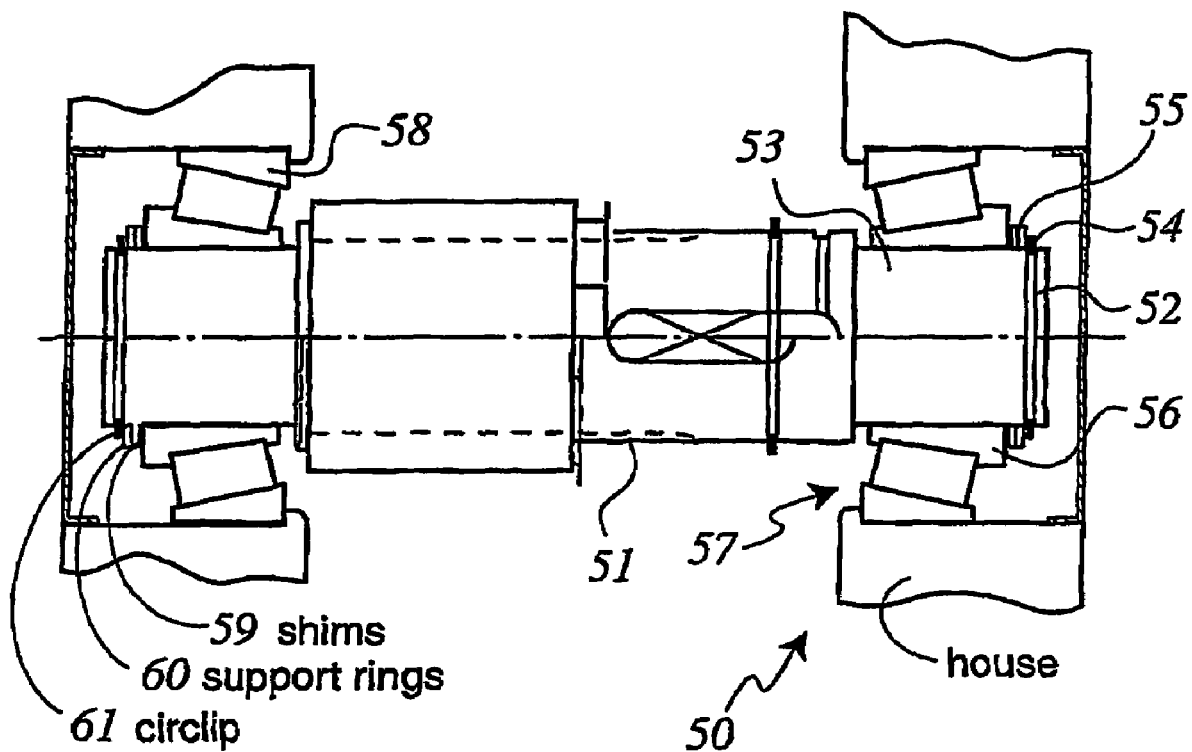
FIG. 3 shows a sectional view of part of another gear unit in accordance with the present invention.

FIG. 3 shows a gear unit 50 having a shaft 51 formed with two circlip grooves 52. One end 53 of the shaft is provided with a circlip 54 and support rings 55 against which the inner cone 56 of one taper roller bearing 57 abuts. Subsequent to assembly of the shaft (with pinion and gear) in the housing together with a second taper roller bearing 58, shims 59 are selected and fitted in addition to second cone support rings 60 such that when locked axially by a second circlip 61 the two taper roller bearings in "O" configuration are held under the required axial pre-load.

The bearing arrangement of the subject invention may be assembled and or adjusted by a method as described in the specification of our co-pending UK application No. 0107923.5 filed 30 Mar. 2001 and entitled 'Method for Forming a Taper Roller Bearing Assembly'.

The invention claimed is:

1. An industrial gear unit, comprising:

a high speed input shaft;

a low speed output shaft;

a housing supporting the high speed input shaft and the low speed output shaft;

an intermediate shaft, with two ends, provided between the high and low speed shafts and housed within the housing; a pair of axially outwardly facing abutment surfaces (32) within the housing;

a pair of tapered roller bearings with outer bearing cups abutting the outwardly facing abutment surfaces, the pair of taper roller bearings being mounted axially spaced apart on the intermediate shaft and orientated such that a roller of each bearing increases in diameter in a direction away for the other bearing of the pair; and two circlip grooves (52) formed on the intermediate shaft; and a first circlip (54) and support rings (55) against which rings an inner cone (56) of a first of the taper roller bearings (57) abuts;

a second circlip (61) axially locking a second of the taper roller bearings (58), wherein, the gear unit is an industrial gear unit, and the first and second circlips hold the two taper roller bearings in an O-configuration held under a required axial pre-load.

* * * * *